United States Patent

Ono

[11] Patent Number: 5,831,630
[45] Date of Patent: Nov. 3, 1998

[54] THREE-DIMENSIONAL MODEL PROCESSING SYSTEM

[75] Inventor: Mieko Ono, Kawasaki, Japan

[73] Assignee: Fujitsu Limited, Kawasaki, Japan

[21] Appl. No.: 509,011

[22] Filed: Jul. 31, 1995

[30] Foreign Application Priority Data

Aug. 4, 1994 [JP] Japan .................................. 6-183166

[51] Int. Cl.$^6$ .................................................. G06T 17/40
[52] U.S. Cl. ............................................................ 345/437
[58] Field of Search .................................. 395/127, 137, 395/119; 345/427, 437, 419

[56] References Cited

U.S. PATENT DOCUMENTS

| | | | |
|---|---|---|---|
| 5,019,809 | 5/1991 | Chen | 395/137 X |
| 5,276,785 | 1/1994 | Mackinlay et al. | 395/127 |
| 5,303,337 | 4/1994 | Ishida | 395/119 |
| 5,422,987 | 6/1995 | Yamada | 395/127 |

FOREIGN PATENT DOCUMENTS 2 271 260   4/1994   United Kingdom.
2 275 158   8/1994   United Kingdom.

*Primary Examiner*—Mark K. Zimmerman
*Attorney, Agent, or Firm*—Staas & Halsey

[57] ABSTRACT

The three-dimensional model processing system comprises a three-dimensional model storage unit that stores three-dimensional model data; position input unit that receives the user's designation of a specific location on a three-dimensional model on a flat display, for example a corner; and display control unit that computes the direction from which the three-dimensional model is being viewed, based on the specific location which the user designated on the three-dimensional model using the position input unit and the three-dimensional model data stored in the three-dimensional model storage unit, and displays the three-dimensional model on a flat display according to the result of that computation.

20 Claims, 15 Drawing Sheets

$$\theta - \eta = 30°$$
$$\alpha + \beta + r = 360°$$
$$\alpha - \beta - r = 120°$$

INFORMATION THAT SPECIFIES THE SOLID PRIMITIVE (3-DIMENSIONAL MODEL)
- INFORMATION ON END POINTS OF THE BASE SURFACE (P1 TO P6)
- END POINT LINKAGE INFORMATION
- PUSH-OUT LOCUS DIRECTION
- PUSH-OUT LOCUS DISTANCE

INFORMATION THAT SPECFIES
THE 3-DIMENSIONAL MODEL

- SURFACE INFORMATION FOR EXAMPLE, THE ELEMENTS THAT MAKE UP THE SURFACE F1 ARE THE EDGE LINES B1 TO B6 AND THE END POINTS P1 TO P6
- EDGE LINE INFORMATION FOR EXAMPLE, THE ELEMENTS THAT MAKE UP THE EDGE LINE B1 ARE THE END POINTS P1 AND P2
- END POINTS INFORMATION THE COORDINATES OF EACH END POINT

FIG. 13A
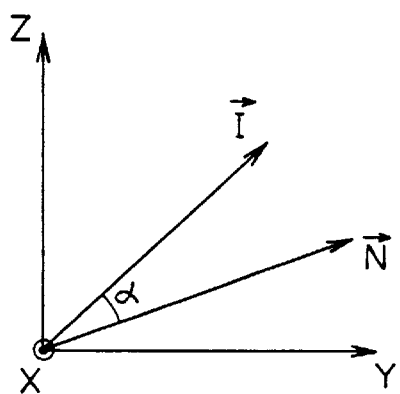
FIG. 13B
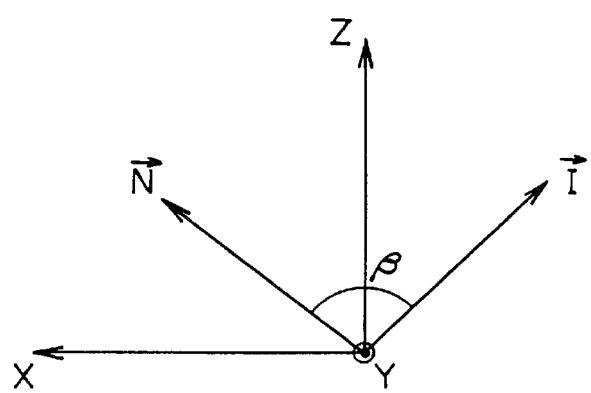
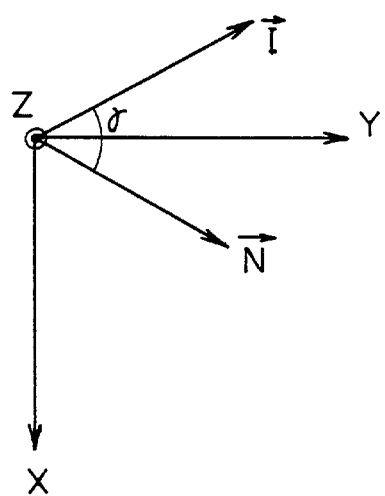
FIG. 13C

THREE-DIMENSIONAL MODEL PROCESSING SYSTEM

BACKGROUND OF THE INVENTION

1. Field of the Invention

This invention relates to a three-dimensional model display system in Computer-Aided Design (CAD). More specifically, it relates to a viewing processing mechanism for computing the direction of the viewpoint from which a three-dimensional model will be viewed.

2. Description of the Related Arts

In a three-dimensional CAD system, when a three-dimensional model is designed, an isometric view is often used to look down on the model diagonally from above as the direction from which the model is viewed.

FIG. 1 is a diagram that explains this isometric view, that is to say, isometric projection. This type of isometric projection is one type of Axiometric projection, a projection method in which the respective scale ratios on the X, Y and Z axes are equal, and in addition the 3 ellipses shown in the figure are all congruent.

The isometric view is used to provide solid perception of models in three-dimensional CAD. Previously, when a view of a model from a certain viewpoint was converted to an isometric view, one of two methods was used: (1) the rotation function was used to rotate the model viewpoint direction by giving instructions manually; or (2) the view was transformed according to a fixed view specification registered in the system.

FIG. 2 is a diagram that explains the method of manually rotating the viewpoint direction by the rotation function. In this figure, the circle 201, which is used as a rotation guide, is displayed on the graphic display 203. This circle 201 represents a hemisphere pointing forward from the screen, that is to say toward the operator. The system is set up so that, by specifying an arbitrary location on this hemisphere, for example by using the mouse 202, the model is displayed as though the three-dimensional model 204 were being viewed from that location. When this method is used, the operator rotates the viewpoint direction in accordance with his own intuition, creating the problem that a desirable viewpoint is difficult to obtain.

When a fixed viewpoint that is registered in the system is specified, and if many directions are registered as fixed viewpoints, then in a sense it is possible to approximate the desired viewing direction, but in practice there is the problem that it is troublesome to make the selection. In addition, there is the problem that the manipulation required to obtain the desired viewing direction can be difficult, depending on the initial orientation of the model.

SUMMARY OF THE INVENTION

The object of this invention is to increase the efficiency of the three-dimensional model design operation by simplifying the specification of the direction from which the three-dimensional model is viewed so as to match human intuition.

The system of this invention has the characteristics that it is a three-dimensional model processing system that displays three-dimensional models on a flat display, and comprises the following units. Specifically, the system has a three-dimensional model storage unit that stores three-dimensional model data; a position input unit that receives the user's designation of a specific location on the three-dimensional model that is displayed on the flat display; and a display control unit that computes the direction from which the three-dimensional model is to be viewed, based on the designated location on the three-dimensional model designated by the user using the position input unit and the three-dimensional model data stored in the three-dimensional model storage unit, and displays the three-dimensional model on the flat display in accordance with the computed result.

The three-dimensional model storage unit stores three-dimensional model data to be displayed on the flat display; these three-dimensional model data are, for example, created by CAD.

The position input unit comprises, for example, a mouse and a keyboard; it is sufficient if it is capable of specifying a position on a display in a computer system such as CAD.

The display control unit detects the location that the user has specified on the display and the location on the three-dimensional model displayed on the display to which the location specified by the user corresponds, based on three-dimensional model data read out from the three-dimensional model storage unit. Then it computes the direction from which the three-dimensional model is to be viewed, using the detected location on the three-dimensional model and information concerning other three-dimensional models, and displays an image of the three-dimensional model seen from that viewpoint on the flat display.

Accordingly, if the user wishes to change the direction from which a three-dimensional model displayed on a flat display, for example in CAD, is viewed, it is sufficient for the user to specify the point on the three-dimensional model that will be on the front side when the three-dimensional model is seen from the new direction. Suppose, for example, that the user is designing a three-dimensional building structure. It is necessary to view this building from many points of view to see if the design is proceeding satisfactorily; the user need only specify the location on the three-dimensional model that it is desired to check, and an image of the structure when that location is viewed from a suitable angle will be displayed, so the user can concentrate on the design without being bothered by troublesome display details.

BRIEF DESCRIPTION OF THE DRAWINGS

FIGS. 13A–C are diagrams showing the relationship between $\vec{N}$ and $\vec{I}$.

DESCRIPTION OF THE PREFERRED EMBODIMENTS

Figure 1:
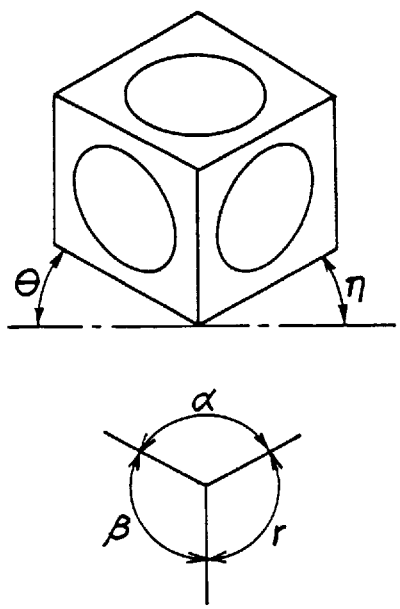
FIG. 1 is a diagram explaining the isometric view.
Figure 2:
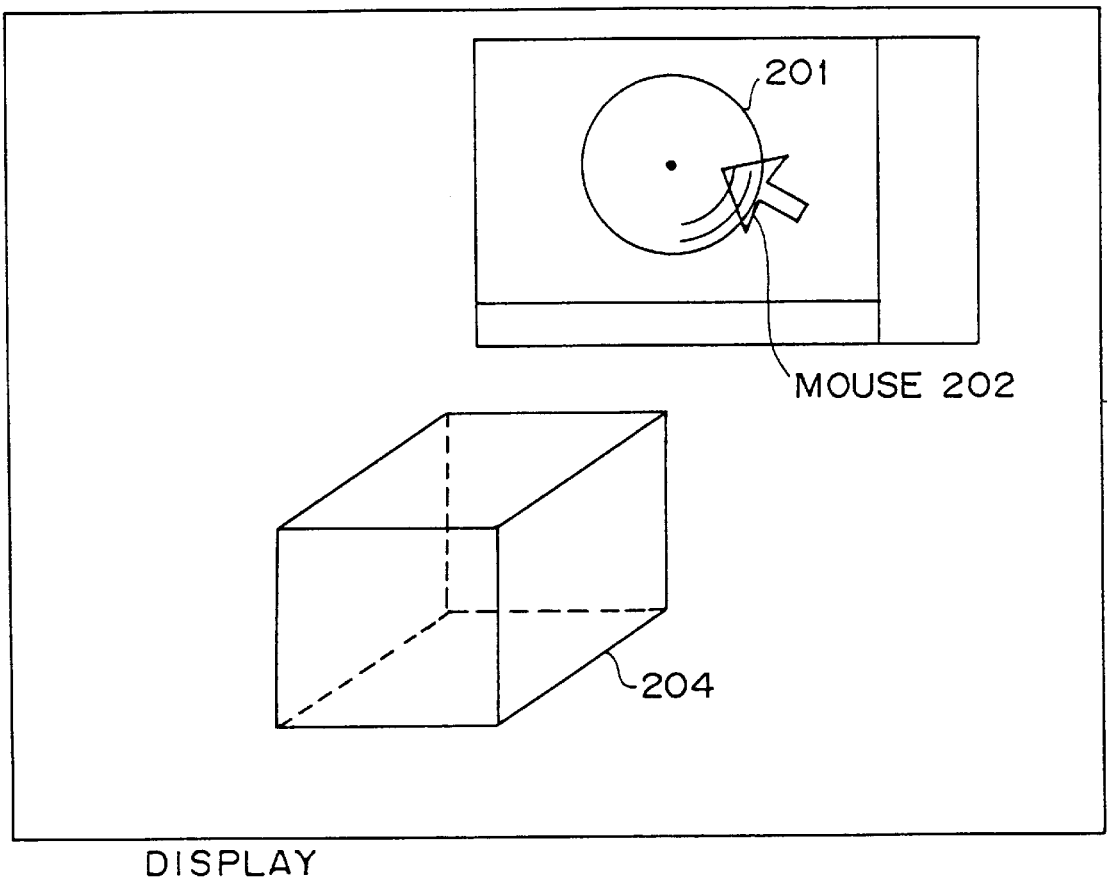
FIG. 2 is a diagram explaining the method of rotating an object display manually to change the direction from which it is viewed.
Figure 3:
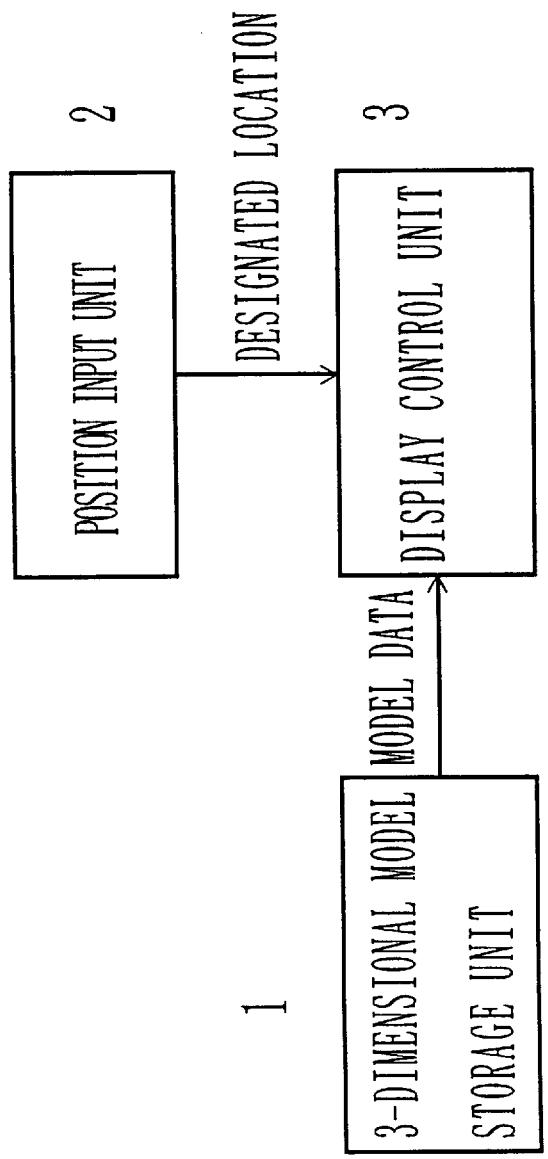
FIG. 3 is a block diagram of the principle of this invention.

FIG. 3 is a block diagram of the principle of this invention. This figure shows a block diagram of the configuration of the principle of the three-dimensional model processing system that displays a three-dimensional model on a flat display.

In FIG. 3, the three-dimensional model storage unit 1 stores three-dimensional model data. The position, input unit 2 receives the user's designation of a specific position on the three-dimensional model displayed on the flat display, for example a corner.

The display control unit 3 computes the direction of the viewpoint from which the three-dimensional model is viewed, based on the specific location on the three-dimensional model designated by the user with the position input unit 2 and the three-dimensional model data stored in the three-dimensional model storage unit 1, and displays the three-dimensional model on the flat display according to the result of that computation.

Of the blocks shown in FIG. 3, the three-dimensional model storage unit 1 comprises, for example, a model management section; the position input unit 2 comprises, for example, a mouse and keyboard and the input processing unit to be discussed below; and the display control unit 3 comprises of, for example, a view computation unit and a view control unit.

In this invention, the user designates a specific location on the three-dimensional model, and the direction of the viewpoint with respect to the three-dimensional model that corresponds to that location is computed. This location designated by the user could be, for example, a corner of the three-dimensional model; the data needed to compute the correction of the viewpoint corresponding to that corner designation are provided by, for example, the computation control unit.

The data that are supplied include, for example, the coordinates of the vertices of the base surface of the three-dimensional model and the direction and distance that the base surface must be extended in order to form the solid body that expresses the three-dimensional model. These computational data are used, for example by the computation processing unit, to compute the direction from which the three-dimensional model is viewed as the reverse direction of the average vector expressing the edge line of the three-dimensional model that passes through the specified corner.

Thus, according to this invention, the direction from which the three-dimensional model is viewed is automatically determined corresponding to, for example, a specified corner of the three-dimensional model.

Figure 4:
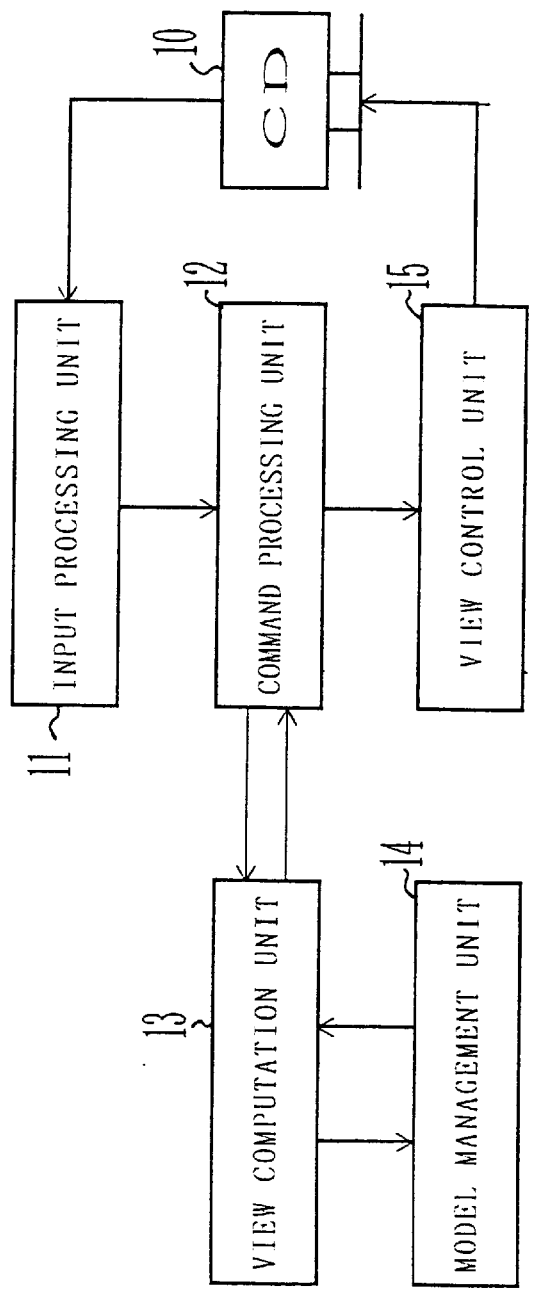
FIG. 4 is a block diagram showing the overall configuration of the viewing computation unit of this invention.

FIG. 4 is a block diagram of the overall configuration of the view computation unit of this invention. In this figure, the view computation unit comprises, for example, a graphic display (GD) 10 that receives the user's specification of a corner of the three-dimensional model using, for example, the mouse; an input processing unit 11 that receives input commands from the GD 10; a command processing unit 12 that receives input commands from the input processing unit 11 and processes the input data; a view computation unit 13 that computes the view direction in accordance with the input data from the command processing unit 12; a model management unit 14 that outputs shape data for the three-dimensional model for the view computation unit 13; and a view control unit 15 that receives the view direction computed by the view computation unit 13 through the command processing unit 12, and controls the display of the three-dimensional model on the graphic display 10.

Figure 5:
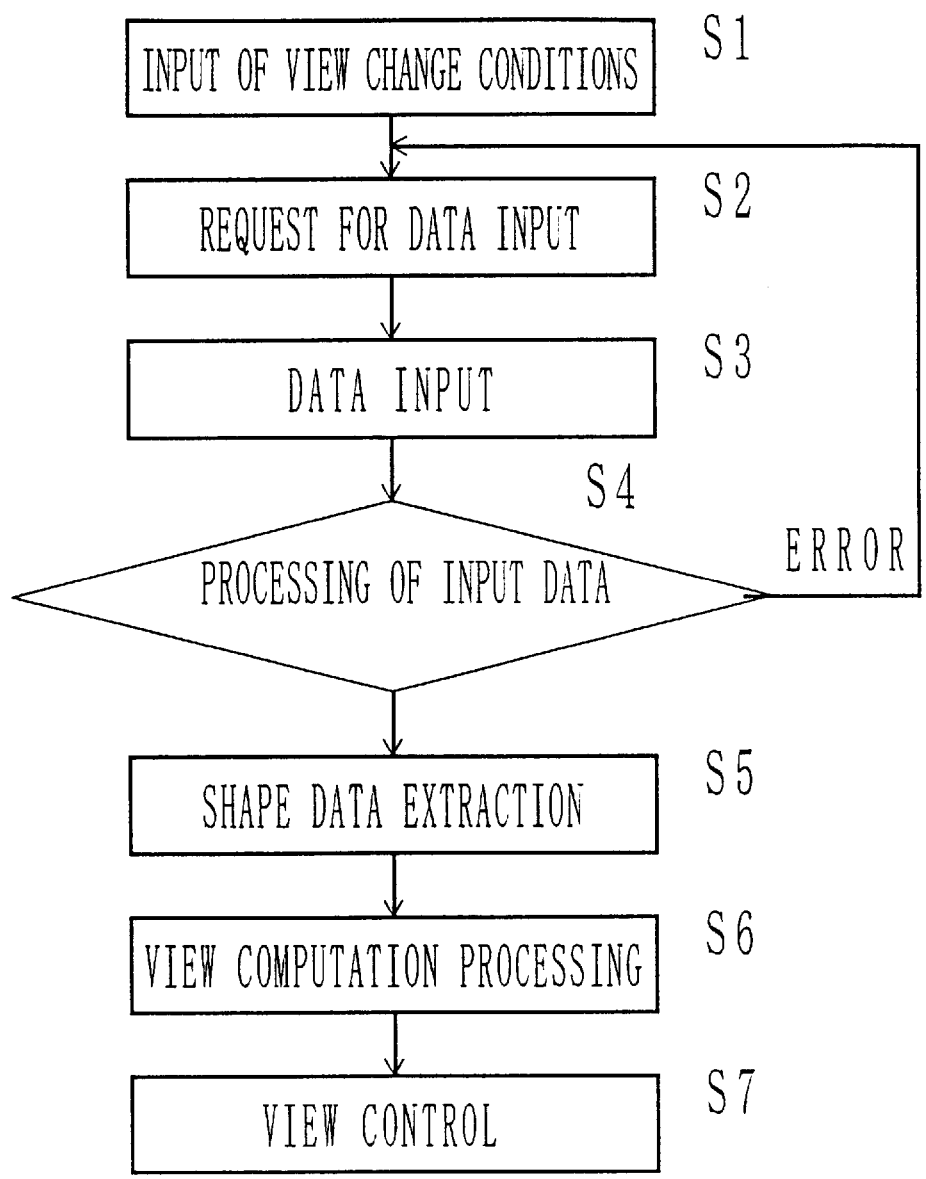
FIG. 5 is a flow chart of the overall processing of the control of the view in this invention.

FIG. 5 is a flow chart of the overall processing of view control in this invention. In this figure, when the processing starts, in the step S1 the viewpoint change conditions are input, for example by the user; then, in steps S2 and S3, data from the graphic display 10 in FIG. 4 are input to the input processing unit 11; then, in step S4, the input data are processed by the input processing unit 11 and the command processing unit 12. For example, in the command processing unit, the necessary data from the information specified on the display screen, for example by the mouse, to be displayed on the display screen, for example corner information, are extracted in accordance with the specified command information. In the processing of these input data, for example, in a case in which the three-dimensional model specified on the screen by the mouse is a cone, the system waits for the next input as an error has occurred, and the processing is repeated from step S2. After the input data processing in step S4 is completed, shape data are output from the model management unit 14 in FIG. 4 to the view computation unit 13 based on those input data, in step S5; then view computation processing is performed in step S6, and, based on the result, view control is performed by the view control unit 15 in FIG. 4 in step S7.

Figure 6:
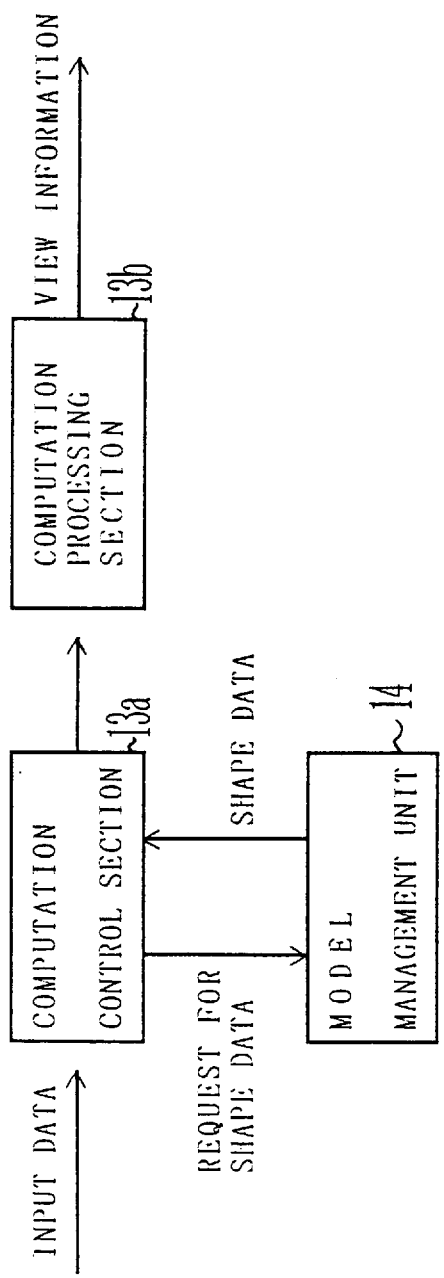
FIG. 6 is a block diagram showing the detailed configuration of the viewing computation unit.

FIG. 6 is a block diagram of the detailed configuration of the view computation unit 13 in FIG. 4. In this figure, the view computation unit 13 comprises the computation control section 13a, which receives input data from the command processing unit 12, and the computation processing section 13b, which outputs view information for the command processing unit 12. Shape data from the model management unit 14 are given to the computation control section 13a. View information output from the computation control section 13b is given to the view control unit 15 through the command processing unit 12 together with input command data output from the input processing unit 11 in FIG. 4.

Figure 7:
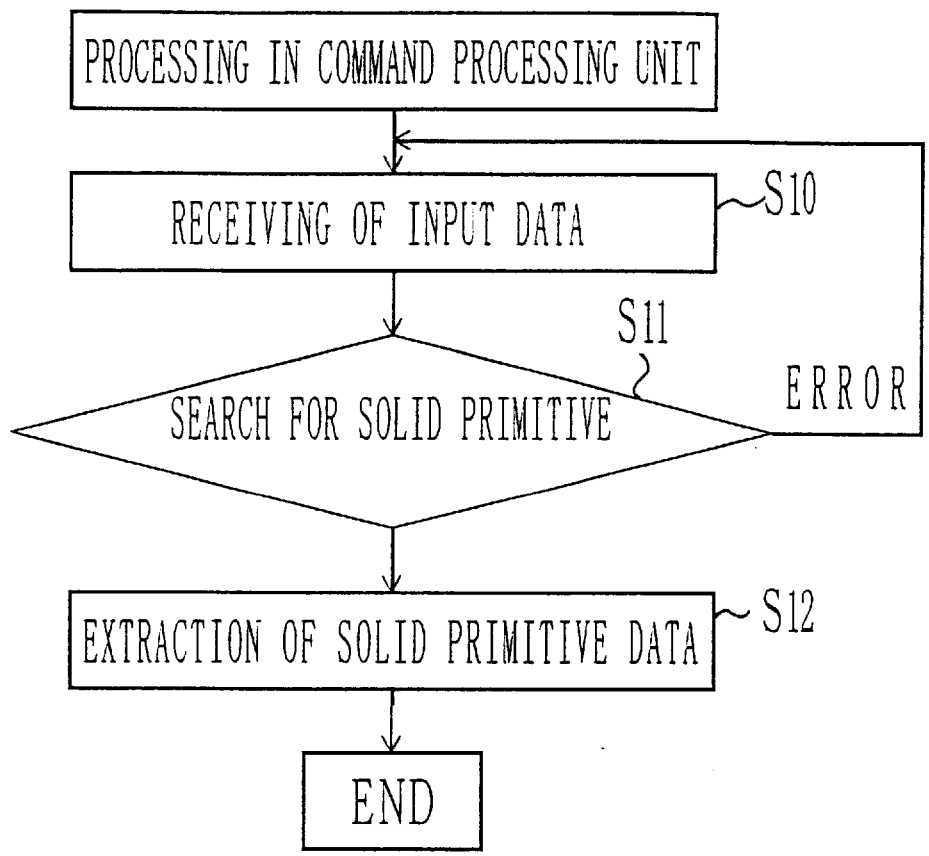
FIG. 7 is a flow chart showing the process of the computation control unit.

FIG. 7 is a flow chart of the processing in the computation control unit shown in FIG. 6. In this figure, processing in the computation control section is performed following the processing in the command processing unit. Input data are received from the command processing unit 12 in step S10; then, corresponding to those input data, the solid primitive, that is to say the three-dimensional model on which a corner has been specified by the user, is searched for in step S11. At the time of this search, if, for example, the three-dimensional model specified by the user is a cone, an error is determined to have occurred, and the processing starting with step S10 is repeated. When the solid primitive is searched for in step S11, the solid primitive shape data are taken from the model management unit 14 in step S12, completing the processing in the computation control section.

Figure 8:
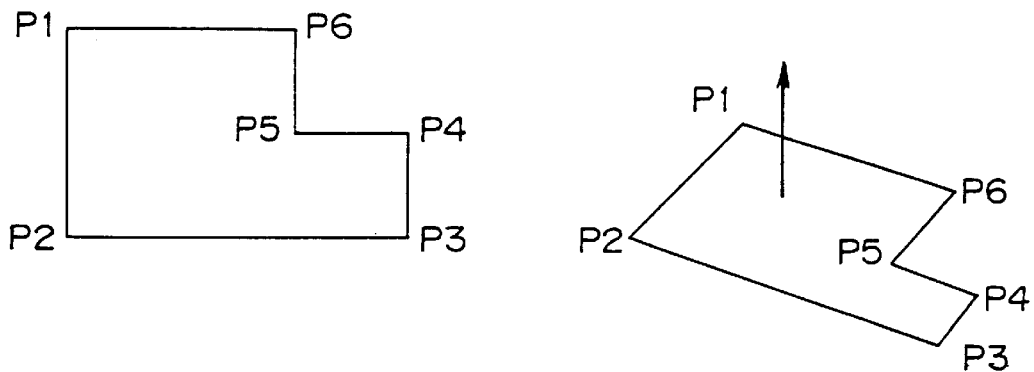
FIG. 8 is an example of three-dimensional primitive shape data.

FIG. 8 shows the shape data of a solid primitive stored in the model management unit 14. These are the shape data of the solid primitive taken from the model management unit 14 in step S12 in FIG. 7. These shape data are the positions of the end points (vertices) of the base surface of the solid primitive; and their linkage information; and the distance and direction that the base surface has to be extended to form the solid primitive. If the extension direction is perpendicular to the base surface, the extension distance becomes the height of the solid primitive.

Figure 9:
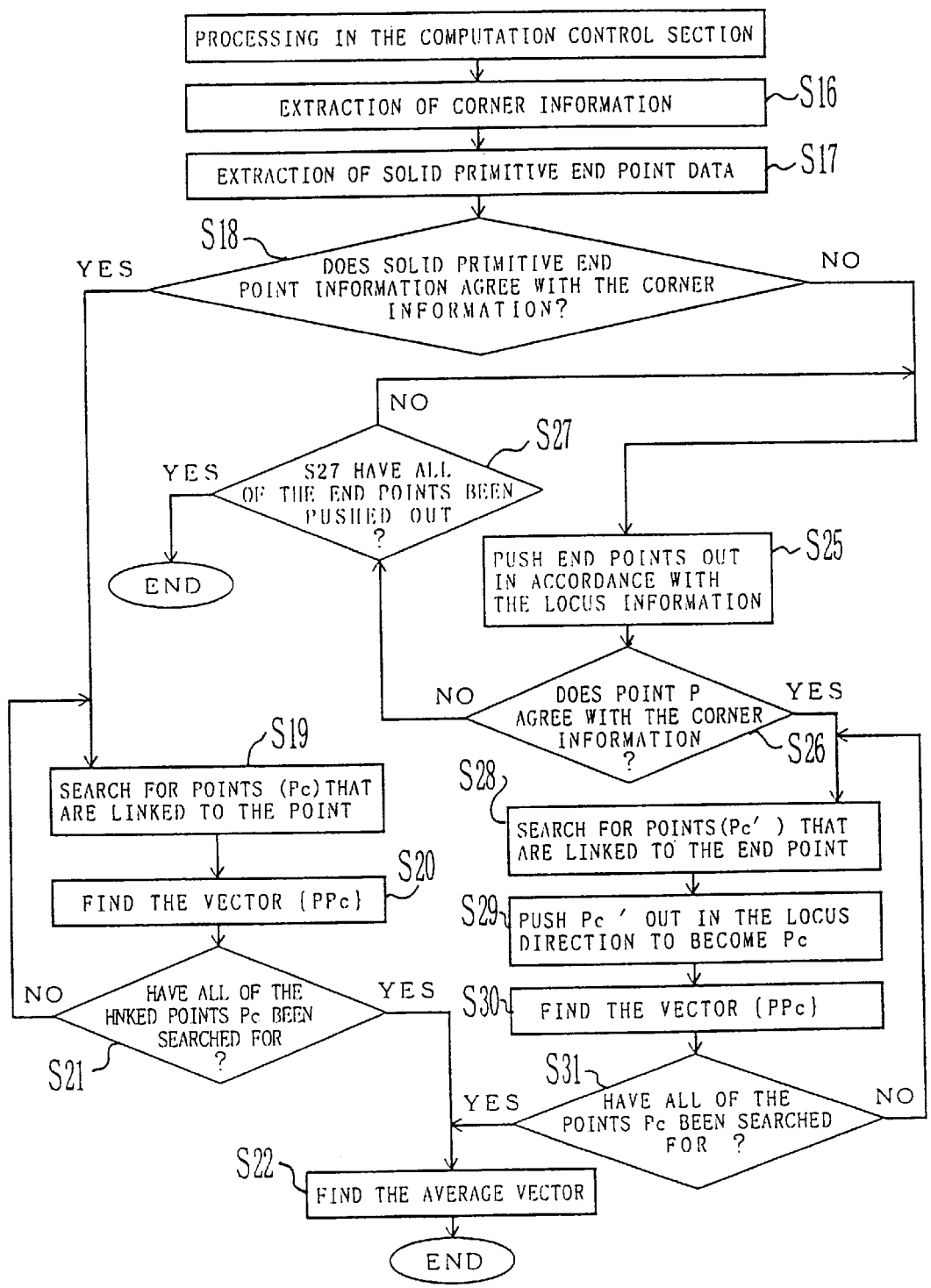
FIG. 9 is a flow chart showing the process of the computation control unit.

FIG. 9 is a flow chart of the processing in the computation processing section. The processing in the processing control section in this figure is performed following the processing in the computation control section. First, in step S16, corner information showing the corner of the three-dimensional model specified by the user is extracted; then, in step S17, solid primitive end point data, that is to say base surface end point data, are extracted, and finally in step S18 an assessment is made as to whether or not the end point data agree with the corner information.

If at least one of the end point data agrees with the corner information, then, in step S19, the points Pc that are coupled to the end point P that agrees with the corner information are searched for; in step S20 the vector PPc is found and in step S21, it is determined as to whether or not all of the coupled points Pc have been searched for.

If all of the coupled points have not yet been searched for, then the processing is repeated starting with step S19. In this case, in step S20 vectors are found not only for end point data, as data for points that are coupled to the point P that agrees with the corner information; but also for points in the height extension direction that are separated by the distance that the base was extended to form the solid primitive. Then, when it is determined in step S21 that the search for all of the coupled points has been completed, the average vector of the three vectors is found in step S22 to complete the processing.

In contrast, if it is determined in step S18 that none of the end point data of the solid primitive agree with the corner information, then in step S25 one of the end points is extended in accordance with the locus information, specifically the extension distance and the extension direction, and is then taken as the point P; and then in step S26 a determination is made as to whether or not the point P agrees with the corner information. If it is determined that there is still no agreement, then in step S27 a determination is made as to whether or not all of the end point data have been extended. When it is determined that all of the end point data have been extended the processing ends.

If it is determined that the extension has not been completed for all of the end points, then the processing starting with step S25 is repeated; when it is determined in step S26 that an extended point P agrees with the corner information, in step S28 the point Pc', that was linked to the point P before it was extended, is searched for. This point is taken as the point Pc extended in the extension direction in step S29; the vector PPc is found in step S30; and it is determined as to whether or not all of the points Pc' have been searched for in step S31.

If not all of the points Pc' have yet been searched for, the processing is repeated starting with step S28; when it is determined that all of the linked points have been searched for, the average vector is found in step S22 to complete the processing. In step S30, as previously stated, a vector corresponding to the height direction of the solid primitive is found.

In the above explanation, the flow chart of the processing in the computation processing section in FIG. 9 was explained on the premise that the data held in the model management unit 14 (FIG. 6) are shape data of the solid primitive explained in FIG. 8; but naturally more general information on all of the end points of a solid figure, that is to say data on the coordinates of those points and the linkages between them, can be used as the 3-dimensional model data of this invention.

Figure 10:
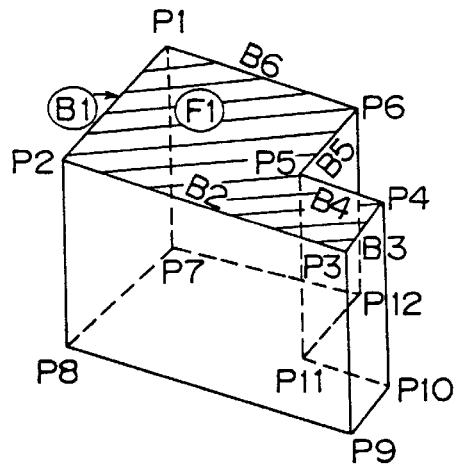
FIG. 10 is a diagram explaining general three-dimensional model data.

FIG. 10 is a diagram which explains such more general three-dimensional model data. In this figure, three-dimensional data are shown in a form in which the coordinates of the end points are given as the information on the end points, information on the end points as the elements which make up the edge lines is given as the information on the edge lines, and information on the edge lines and information on the end points as the elements which make up the surfaces are given as the information on the surfaces. Thus, having all of the end point information held in the model management unit 14 makes it easy to obtain, for example, information on the end point selected by the user's designation of a corner and on the end points that are linked to it, from the model management unit 14; then computation of the average edge line vector passing through the corner designated by the user is executed.

Described below is a method of changing a view.

Figure 11A:
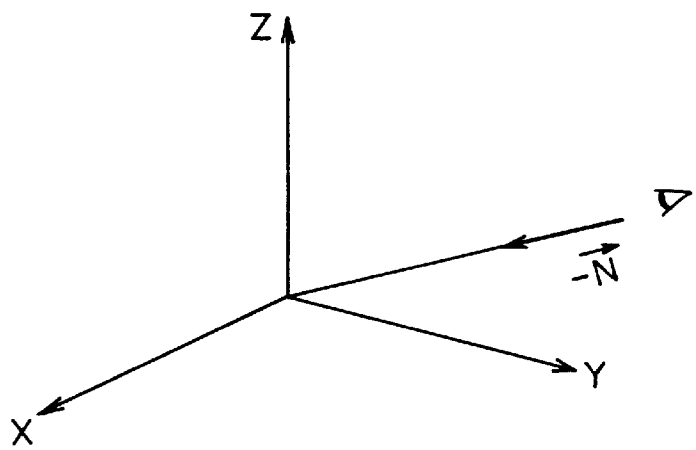
FIGS. 11A, B are diagrams for explaining the relationship between a viewpoint vector $\vec{N}$ and a display plane.

FIG. 11A shows the relationship between a viewpoint vector $\vec{N}$ and the coordinate system (X,Y,Z) defining a three-dimensional model.

The direction for viewing the three-dimensional model is defined by the coordinate (X,Y,Z) as indicated by the arrow shown in FIG. 11A, and represented by the vector inverse to the viewpoint. The viewpoint vector $\vec{N}$ indicates the direction in which the user views the three-dimensional model.

Figure 11B:
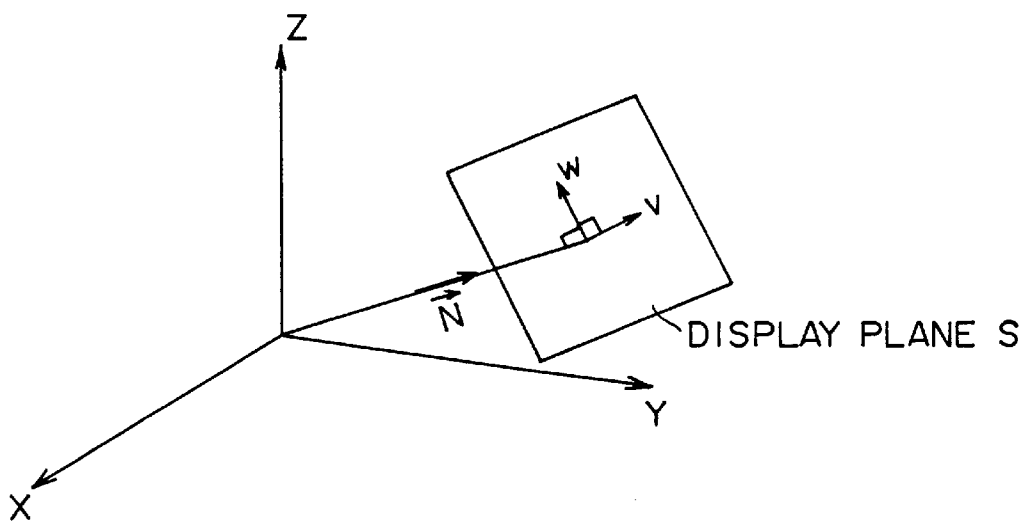

FIG. 11B shows the relationship between the coordinate system (X,Y,Z) defining a three-dimensional model and the displayed plane S indicating the three-dimensional model. They relate to each other through the viewpoint vector $\vec{N}$. The displayed plane S is defined by the plane perpendicular to vector $\vec{N}$. The displayed plane S has another two-dimensional coordinate system (V,W) defined on it. The coordinate system (V,W) is defined as a right-angle coordinate system, and the V and W axes are defined as forming a right angle with each other.

Figure 12:
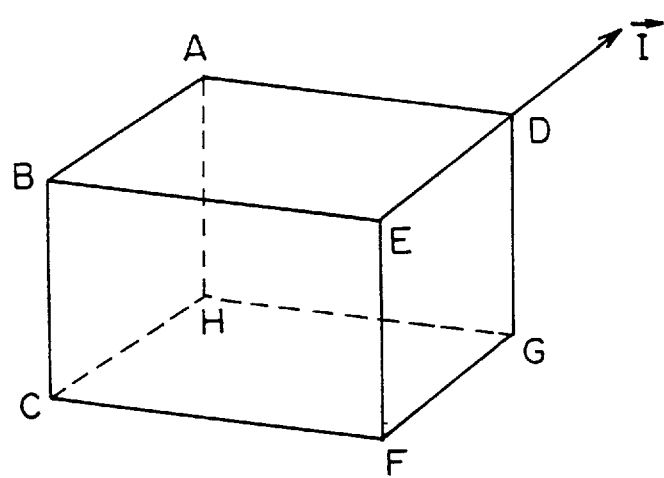
FIG. 12 is a diagrams showing a general view of vector $\vec{I}$ obtained when a corner on a three-dimensional model is designated by a user.

FIG. 12 indicates vector $\vec{I}$ obtained when a point (a corner D) in the three-dimensional model is specified. $\vec{I}$ can be calculated by the following equation (1).

$$\vec{I} = -\frac{1}{3}\left( \frac{\vec{DA}}{|DA|} + \frac{\vec{DE}}{|DE|} + \frac{\vec{DG}}{|DG|} \right) \quad (1)$$

where $\vec{I}$ is recognized as a new viewpoint for viewing the three-dimensional model shown in FIG. 12.

A coordinate system (V',W') on the displayed plane S displaying the graphics viewed from the viewpoint $\vec{I}$ is determined as in the case shown in FIG. 11B. That is, $\vec{I}$ indicates a vector inverse to an average vector of an edge line, and a plane vertical to $\vec{I}$ is referred to as the displayed plane S'. The coordinates (V',W') on the displayed plane S' are determined using $\vec{I}$. For example, assuming that the unit vector in the direction of the coordinate axis V is $\vec{V}$, and that the unit vector in the direction of the coordinate axis W is $\vec{W}$, these vectors can be calculated as follows.

$$\vec{V} = \frac{\vec{I} \times \vec{DG}}{|\vec{I} \times \vec{DG}|}, \vec{W} = \frac{\vec{I} \times \vec{V}}{|\vec{I} \times \vec{V}|} \qquad (2)$$

Thus, a new viewpoint vector $\vec{I}$ and the coordinate system (V',W') on the displayed plane S' can be obtained.

Explained below is the rotation of a three-dimensional model associated with a change of the viewpoint from the present viewpoint $\vec{N}$ to the new viewpoint $\vec{I}$.

FIG. 13A shows the angle $\alpha$ formed by vectors $\vec{I}$ and $\vec{N}$ projected on the plane YZ. Likewise, FIG. 13B shows the angle $\beta$ formed by vectors $\vec{I}$ and $\vec{N}$ projected on the plane XZ, and FIG. 13C shows the angle $\gamma$ formed by vectors $\vec{I}$ and $\vec{N}$ projected on the plane XY. Assume that a point on the three-dimensional model is represented by $(a_x, a_y, a_z)$, and a point on the three-dimensional model which has been rotated by the angles $\alpha$, $\beta$, and $\gamma$ is represented by $(a'_x, a'_y, a'_z)$. The rotation of the three-dimensional model made by the change of the viewpoint is represented by the following equations.

$$(a'_x, a'_y, a'_z) = (a_x, a_y, a_z) \begin{pmatrix} r11 & r12 & r13 \\ r21 & r22 & r23 \\ r31 & r32 & r32 \end{pmatrix} \qquad (3)$$

$r11 = \cos \beta \cos \gamma$ $r12 = \sin \alpha \sin \beta \cos \gamma - \cos \alpha \sin \gamma$ $r13 = \cos \alpha \sin \beta \cos \gamma + \sin \alpha \sin \gamma$ $r21 = \cos \beta \sin \gamma$ $r22 = \sin \alpha \sin \beta \sin \gamma + \cos \alpha \cos \gamma$ $r23 = \cos \alpha \sin \beta \sin \gamma - \sin \alpha \cos \gamma$ $r31 = -\sin \beta$ $r32 = \sin \alpha \cos \beta$ $r33 = \cos \alpha \cos \beta \qquad (4)$ Then, the coordinates of each point of the three-dimensional model are converted into the coordinates of the coordinate system (V',W') on the displayed plane by projecting the three-dimensional model rotated according to the above equations (3) and (4) on the displayed plane S'.

For example, assume that the point specified by the user when the viewpoint is changed is O (Ox, Oy, Oz) (corresponding to the point D in the case shown in FIG. 12), and that the point obtained as the rotation result according to the above listed equations (3) and (4) is represented as O' (O'x, O'y, O'z). Vectors $\vec{V}''$ and $\vec{W}''$ refer to vectors $\vec{V}'$ and $\vec{W}'$ rotated in the same manner after being calculated by equation (3) above, wherein $\vec{V}''$ and $\vec{W}''$ are defined below, $$\vec{V}'' = (m1, m2, m3), \vec{W}'' = (n1, n2, n3) \qquad (5)$$

Then the coordinates (a"v, a"w) on the displayed plane S" (displayed plane defined by vectors $\vec{V}''$ and $\vec{W}''$) of the three-dimensional model can be obtained by the following equation.

$a''v = m1(ax'-ox') + m2(ay'-oy') + m3(a'z-o'z)$ $a''w = n1(ax'-ox') + n2(ay'-oy') + n3(a'z-o'z) \qquad (6)$ Based on the coordinates (a"v, a"w), three-dimensional graphics projected on the displayed plane S" are drawn to give the final result.

Thus explained is the method of changing a view accompanied by a change in the viewpoint of a three-dimensional model. Such a method is described in, for example, the *CG Handbook* published by the Morikita Publishing Company.

Figure 14:
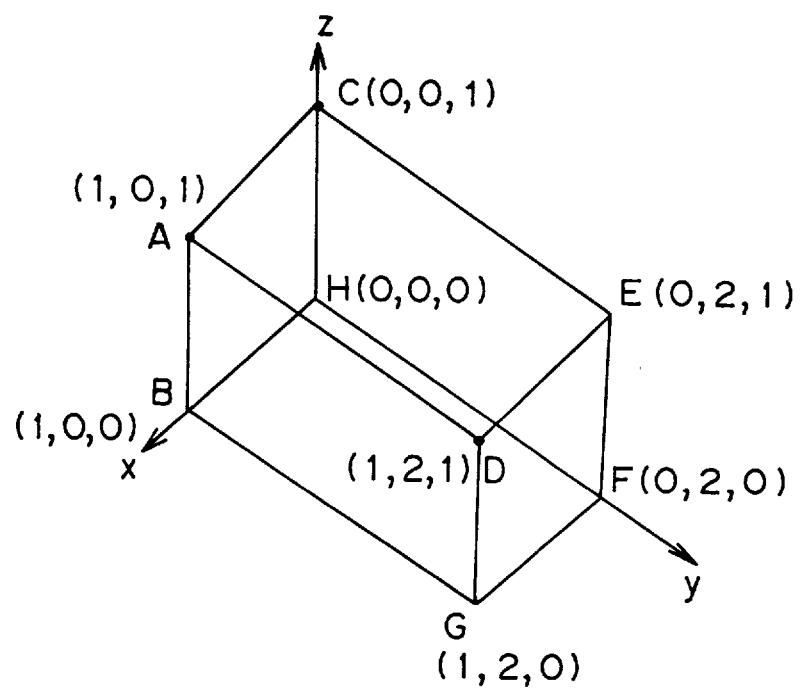
FIG. 14 is a diagram for explaining a specific example of a change of view.

FIG. 14 practically illustrates the above described method of changing a view. The change of a view with the corner B specified by the user is explained by referring to FIG. 14. Assume that the present viewpoint is $$\vec{N} = (1,1,1) \qquad (7).$$

After the user specifies the corner B, the vector $\vec{I}$ indicating a new viewpoint is determined by equation (1). First, the vectors corresponding to $\vec{DA}$, $\vec{DE}$, and $\vec{DG}$ in equation (1) are calculated by the following equations in steps S20 or S30 shown in FIG. 9.

$\vec{BA} = (0, 0, 1)$ $\vec{BH} = (-1, 0, 0)$ $\vec{BG} = (0, 2, 0) \qquad (8)$ In step S22 shown in FIG. 9, $\vec{I}$ is calculated by the equation (1).

$$\vec{I} = -\frac{1}{3} \left( \frac{\vec{BA}}{|\vec{BA}|} + \frac{\vec{BH}}{|\vec{BH}|} + \frac{\vec{BG}}{|\vec{BG}|} \right) = \frac{1}{3} (1, -1, -1) \qquad (9)$$

Then the coordinate axes $\vec{V}'$ and $\vec{W}'$ on the displayed plane S' are calculated according to equation (2). If $\vec{DG}$ is $\vec{BA}$, then $\vec{BA} = (0, 0, 1)$ and $$\vec{V}' = \frac{1}{\sqrt{2}} (-1, -1, 0), \vec{W}' = \frac{1}{\sqrt{6}} (-1, 1, -2) \qquad (10)$$

The three-dimensional model is rotated according to equations (3) and (4).

In this case, $$\alpha = 180°, \beta = 90°, \gamma = 90° \qquad (11)$$

Accordingly, equation (4) outputs the following values.

$r11 = 0 \qquad r31 = -1 \qquad (12)$
$r12 = 1 \qquad r32 = 0$
$r13 = 0 \qquad r33 = 0$
$r21 = 0$
$r22 = 0$
$r23 = -1$ Equation (3) is represented as follows.

$$(a'x, a'y, a'z) = (ax, ay, az) \begin{pmatrix} 0 & 1 & 0 \\ 0 & 0 & -1 \\ -1 & 0 & 0 \end{pmatrix} \qquad (13)$$

$$= (-az, ax, -ay)$$

Each point shown in FIG. 14 is represented as follows.

A: $(1,0,1) \rightarrow A'(-1,1,0)$

B: $(1,0,0) \rightarrow$ B'$(0,1,0)$

C: $(0,0,1) \rightarrow$ C'$(-1,0,0)$

D: $(1,2,1) \rightarrow$ D'$(-1,1,-2)$

E: $(0,2,1) \rightarrow$ E'$(-1,0,-2)$

F: $(0,2,0) \rightarrow$ F'$(0,0,-2)$

G: $(1,2,0) \rightarrow$ G'$(0,1,-2)$

H: $(0,0,0) \rightarrow$ H'$(0,0,0)$ (14)

Likewise, $\vec{V}'$ and $\vec{W}'$ in equation (10) are converted as follows.

$$\vec{V}'' = \frac{1}{\sqrt{2}}(0,-1,1), \quad \vec{W}'' = \frac{1}{\sqrt{6}}(2,-1,-1) \quad (15)$$

Since O=B'=(0,1,0), equation (6) can be represented as follows.

$$a''v = -\frac{1}{\sqrt{2}}(a'y - 1) + \frac{1}{\sqrt{2}}a'z$$

$$a''w = \frac{2}{\sqrt{6}}a'x - \frac{1}{\sqrt{6}}(a'y - 1) - \frac{1}{\sqrt{6}}a'z \quad (16)$$

According to equation (16), each point is converted into a point on the displayed plane S" defined by vectors $\vec{V}''$ and $\vec{W}''$ as follows.

$$A'(-1,1,0) \rightarrow (0,-2/\sqrt{6})$$
$$B'(0,1,0) \rightarrow (0,0)$$
$$C'(-1,0,0) \rightarrow (1/\sqrt{2}, -1/\sqrt{6})$$
$$D'(-1,1,-2) \rightarrow (-2/\sqrt{2}, 0)$$
$$E'(-1,0,-2) \rightarrow (-1/\sqrt{2}, 1/\sqrt{6})$$
$$F'(0,0,-2) \rightarrow (-1/\sqrt{2}, 3/\sqrt{6})$$
$$G'(0,1,-2) \rightarrow (-2/\sqrt{2}, 2/\sqrt{6})$$
$$H'(0,0,0) \rightarrow (1/\sqrt{2}, 1/\sqrt{6})$$

Figure 15:
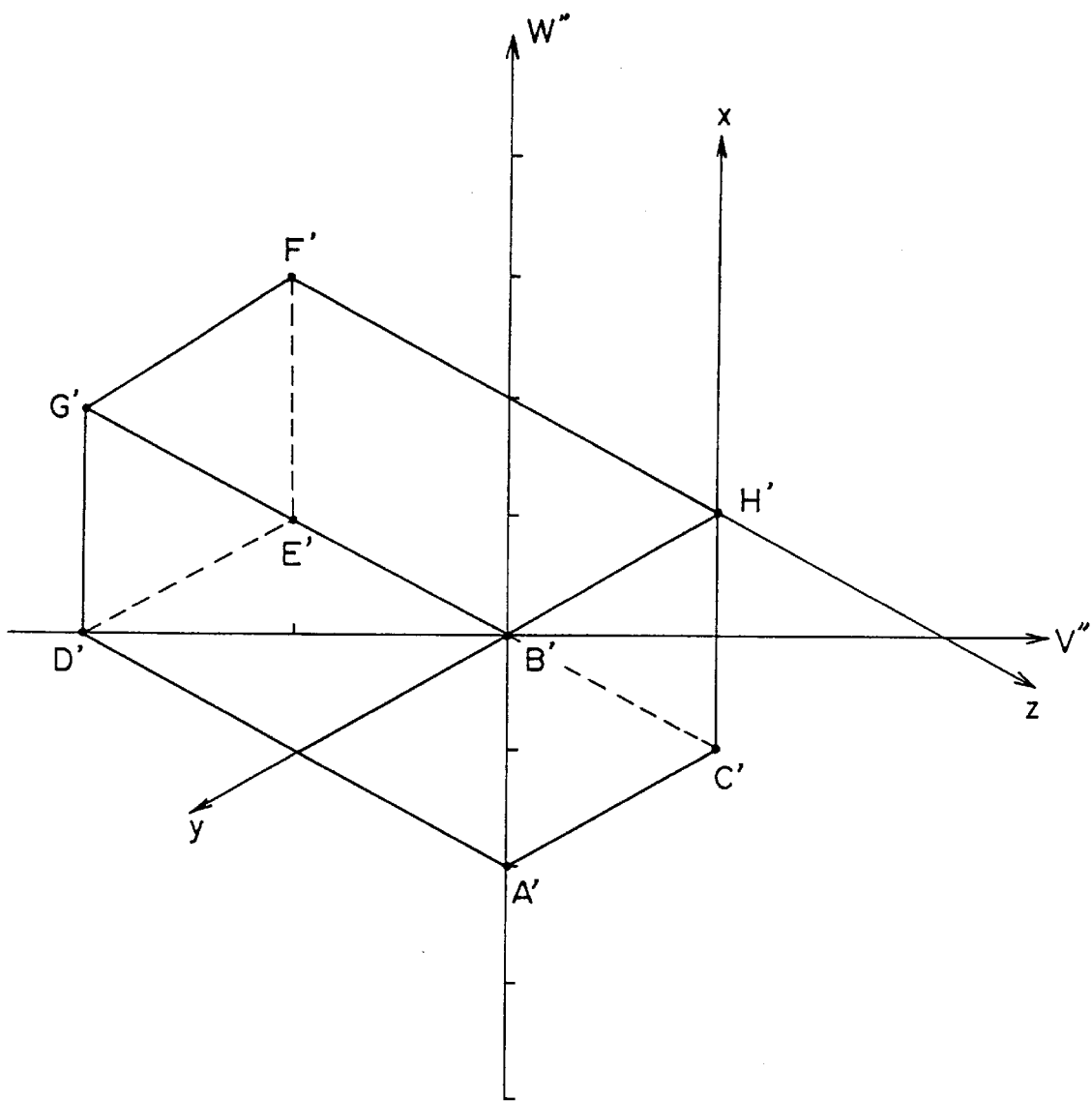
FIG. 15 is the result of a change of view.

FIG. 15 shows each of the above listed points plotted on the coordinate system (V",W") of the displayed plane S", and shows how the graphics in FIG. 14 are displayed as a result of the change of the viewpoint.

In FIG. 15, each of the x, y, and z axes indicates a coordinate system which defines the graphics A'B'C'D'E'F'G'H'.

The point B' is specified by a user when the viewpoint is changed, and is positioned at the origin of the coordinates (V",W") of the displayed plane. Thus, according to the present embodiment, the viewpoint of three-dimensional graphics can be easily changed only by specifying a point of the three-dimensional graphics displayed on the screen of the CAD, etc.

In the above explanation, the viewpoint direction was determined as the reverse direction of the average vector of the edge line vectors passing through the corner specified by the user; but it is also possible to determine the viewpoint direction as, for example, the direction of the vector passing through the corner and the center of gravity, or by specifying an edge line of the three-dimensional model as specified by the user.

As described in detail above according to the present invention, the viewpoint in the three-dimensional CAD can be easily changed to match human intuition, thereby greatly improving the operability of the three-dimensional CAD.

What is claimed is:

1. A three-dimensional model processing system for displaying a three-dimensional model representing a solid figure on a flat display, comprising:

three-dimensional storage means for storing data of the three-dimensional model;

position input means for receiving a user's designation of a specific location which is located on the three-dimensional model in the three dimensional coordinate system, wherein the specific location is an end point on the solid figure; and display control means for, based on the specific location on the three-dimensional model that has been designated by a user with said position input means and on the data of the three-dimensional model stored in said three-dimensional model storage means, computing a direction from which the three-dimensional model is viewed and displaying the three-dimensional model on the flat display corresponding to a result of the computation.

2. The three-dimensional model processing system according to claim 1, wherein said display control means comprises viewpoint computation means for computing the direction of a viewpoint from which the three-dimensional model is viewed, based on the specific location on the three-dimensional model and the data of the three-dimensional model; and view control means for projecting the three-dimensional model on a plane perpendicular to the viewpoint direction corresponding to the viewpoint direction output from said viewpoint computation means, and displaying the three-dimensional model on the flat display.

3. The three-dimensional model processing system according to claim 2, wherein said viewpoint computation means comprises:

computation processing means for executing the computation of the viewpoint direction from which the three-dimensional model is viewed; and computation control means for giving the designated location on the three-dimensional model and the three-dimensional model data to said computation processing means, and controlling the computation by said computation processing means.

4. The three-dimensional model processing system according to claim 3, wherein said specific location on the three-dimensional model that is designated by the user is a corner of the three-dimensional model, and said computation processing means computes a reverse direction of an average of vectors that express edge lines of the three-dimensional model that pass through the designated corner, corresponding to the corner specification, as a viewpoint direction.

5. The three-dimensional model processing system according to claim 4, wherein said three-dimensional model storage means comprises a model management means that outputs surface data, edge line data and end point data of a solid figure that express the three-dimensional model, on which a corner was designated by the user, to the computation control means.

6. The three-dimensional model processing system according to claim 4, wherein said computation processing means uses coordinates of each of the vertices of a base surface of the three-dimensional model, a direction in which the base surface has to be extended to form a solid figure that expresses the three-dimensional model, and a distance that the base surface is extended out, to find an average of vectors that express edge lines of the three-dimensional model.

7. The three-dimensional model processing system according to claim 6, wherein said three-dimensional model storage means comprises model management means that outputs coordinates of each vertex of the base surface of the three-dimensional model of which a corner has been designated by the user, a direction in which the base surface has to be extended to form the solid figure that expresses the three-dimensional model, and a distance by which the base surface has to be extended, to the computation control means.

8. The three-dimensional model processing system according to claim 6, wherein said computation processing means determines whether or not a corner designated by the user agrees with one of the vertices of the base surface of the three-dimensional model;

searches for the vertices that form edge lines that are linked to a point of agreement when the corner agrees with one of the vertices;

finds three unit vectors that express the edge lines from vectors that link the vertices that were searched for to the point of agreement; and finds an average of the three unit vectors.

9. The three-dimensional model processing system according to claim 6, wherein said computation processing means:

determines whether or not one of vertices of the base surface of the three-dimensional model agrees with a corner designated by the user;

moves the vertices of the base surface in the extension direction by the extension distance when none of the vertices agree with the corner;

determines whether or not any of the moved vertices agrees with the corner designated by the user;

searches for the vertices that are linked to the vertex that agrees with the corner before the vertices were moved, comprising the vertices that express the edge lines of the base surface when any of the vertices agree with the corner designated by the user;

finds three unit vectors that express the edge lines from vectors that link the vertex that agrees with the corner to searched-for points that were moved in the extension direction by the extension distance, and to a position of the vertex that agrees with a designated corner before the vertex was moved; and finds an average of the three unit vectors.

10. The three-dimensional model processing system according to claim 3 further comprising:

command processing means for receiving a command from the user that designates a location on the three-dimensional model and giving data of the command to said computation control means; and an output of said computation processing means to said view control means.

11. The three-dimensional model processing system according to claim 3, wherein said location specified by the user is a corner of the three-dimensional model; and said computation processing means computes a direction linking the designated corner to a center of gravity of the three-dimensional model as a viewpoint direction corresponding to the corner specification.

12. The three-dimensional model processing system according to claim 1, wherein, said specific location on the three-dimensional model designated by the user is an edge line of the three-dimensional model.

13. A three-dimensional model processing system for displaying a three-dimensional model on a flat display, comprising:

three-dimensional storage means for storing data of the three-dimensional model;

position input means for receiving a user's designation of a specific location on the three-dimensional model, wherein the specific location is a corner of the three-dimensional model;

display control means for, based on the specific location and the data of the three-dimensional model stored in said three-dimensional model storage means, computing a viewing direction of the three-dimensional model and displaying the three-dimensional model; and computation processing means for computing a reverse direction of an average of vectors that express edge lines of the three-dimensional model that pass through the corner as a viewpoint direction.

14. The three-dimensional model processing system according to claim 13, wherein said display control means comprises:

viewpoint computation means for computing the direction of a viewpoint from which the three-dimensional model is viewed, based on the specific location of the three-dimensional model and the data of the three-dimensional model; and view control means for projecting the three-dimensional model on a plane perpendicular to the viewpoint direction output from said viewpoint computation means, and displaying the three-dimensional model on the flat display.

15. The three-dimensional model processing system according to claim 14, wherein said three-dimensional storage means comprises a model management means that outputs surface data, edge line data and end point data of a solid figure that express the three-dimensional model to the computation processing means.

16. The three-dimensional model processing system according to claim 14, wherein said computation processing means uses coordinates of each vertice of a base surface of the three-dimensional model, a direction in which the base surface has to be extended to form a solid figure that expresses the three-dimensional model, and a distance that the base surface is extended, to find an average of vectors that express edge lines of the three-dimensional model.

17. The three-dimensional model processing system according to claim 16, wherein said computation processing means:

determines whether or not a corner designated by the user agrees with one of the vertices of the base surface of the three-dimensional model;

searches for the vertices that form edge lines that are linked to a point of agreement when the corner agrees with one of the vertices;

finds three unit vectors that express the edge lines from vectors that link the vertices that were searched for to the point to agreement; and finds an average of the three unit vectors.

18. The three-dimensional model processing system according to claim 16, wherein said computation processing means:

determines whether or not one of vertices of the base surface of the three-dimensional model agrees with a corner designated by the user;

moves the vertices of the base surface in the extension direction by the extension distance when none of the vertices agree with the corner;

determines whether or not any of the moved vertices agrees with the corner designated by the user;

searches for the vertices that are linked to the vertex that agrees with the corner before the vertices were moved;

finds three unit vectors that express the edge lines from vectors that link the vertex that agrees with the corner to searched-for points that were moved in the extension direction by the extension distance; and finds an average of the three unit vectors.

19. A method for displaying a three-dimensional model, comprising the steps of:

storing data of the three-dimensional model;

receiving a user's designation of a corner of the three-dimensional model;

computing a viewing direction of the three-dimensional model and displaying the three-dimensional model based on the designated corner and the stored data of the three-dimensional model; and computing a reverse direction of an average of vectors that express edge lines of the three-dimensional model that pass through the corner as a viewpoint direction.

20. The method for displaying a three-dimensional model according to claim 19, further comprising the steps of:

determining whether a plurality of vertices of a base surface of the three-dimensional model agrees with the designated corner;

moving the vertices of the base surface in the extension direction by the extension distance when none of the vertices agree with the corner;

determining whether any of the moved vertices agrees with the corner designated by the user;

searching for the vertices that are linked to the vertex that agrees with the corner before the vertices were moved;

finding three unit vectors that express the edge lines from vectors that link the vertex that agree with the corner to searched-for points that were moved in the extension direction by the extension distance, and to a position of the vertex that agrees with a designated corner before the vertex was moved; and finding an average of the three unit vectors.

* * * * *